US006874732B2

(12) United States Patent
Duden et al.

(10) Patent No.: US 6,874,732 B2
(45) Date of Patent: Apr. 5, 2005

(54) FORM FACTORED COMPLIANT METALLIC TRANSITION ELEMENT FOR ATTACHING A CERAMIC ELEMENT TO A METALLIC ELEMENT

(75) Inventors: Quenten E. Duden, Tucson, AZ (US); Wayne L. Sunne, Tucson, AZ (US); James H. Gottlieb, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/313,713

(22) Filed: Dec. 4, 2002

(65) Prior Publication Data

US 2005/0045766 A1 Mar. 3, 2005

(51) Int. Cl.[7] .................................................. B64C 1/10
(52) U.S. Cl. ..................... 244/121; 244/129.3; 244/131
(58) Field of Search ................................ 244/121, 131, 244/129.3, 132; 343/872; 285/124.5

(56) References Cited

U.S. PATENT DOCUMENTS

| | | | | | |
|---|---|---|---|---|---|
| 2,784,926 | A | * | 3/1957 | Bonza et al. | 244/129.3 |
| 2,959,382 | A | * | 11/1960 | Turner | 244/122 AG |
| 3,177,811 | A | | 4/1965 | Marshall et al. | |
| 4,011,819 | A | * | 3/1977 | Kessler | 244/131 |
| 4,324,373 | A | * | 4/1982 | Zibritosky | 244/121 |
| 4,520,364 | A | | 5/1985 | Perry | |
| 4,702,439 | A | * | 10/1987 | Kelley et al. | 244/158 A |
| 5,372,333 | A | * | 12/1994 | Uwira et al. | 244/3.16 |
| 5,691,736 | A | * | 11/1997 | Hunn et al. | 343/872 |
| 5,758,845 | A | | 6/1998 | Sunne et al. | |
| 5,853,149 | A | | 12/1998 | Vo et al. | |
| 5,884,864 | A | | 3/1999 | Sunne et al. | |
| 5,941,479 | A | | 8/1999 | Sunne et al. | |
| 6,123,026 | A | | 9/2000 | Gottlieb | |
| 6,241,184 | B1 | | 6/2001 | Sunne et al. | |

FOREIGN PATENT DOCUMENTS

| | | |
|---|---|---|
| EP | 0828311 A | 3/1998 |
| EP | 0828312 A | 3/1998 |

* cited by examiner

*Primary Examiner*—Tien Dinh
(74) *Attorney, Agent, or Firm*—Thomas J. Finn; John E. Gunther; Karl A. Vick

(57) ABSTRACT

A ceramic element, e.g., a sapphire dome, is joined to a metallic element, e.g., a vehicle body comprising a titanium alloy, by an attachment structure, e.g., comprising niobium. The attachment structure comprises: (1) a form-factored, compliant metallic transition element having a "C" shape; (2) a first joint material connecting an upper portion of the transition element to the ceramic element; and (3) a second joint material connecting a lower portion of the transition element to the metallic element. A method is provided for attaching the ceramic element to the metallic element, using a single brazing operation. The presence of the attachment structure further minimizes the stresses related to the different coefficients of thermal expansion in the ceramic/attachment/titanium connection.

21 Claims, 2 Drawing Sheets

FORM FACTORED COMPLIANT METALLIC TRANSITION ELEMENT FOR ATTACHING A CERAMIC ELEMENT TO A METALLIC ELEMENT

TECHNICAL FIELD

The present invention relates generally to attaching or securing a ceramic element to a metallic element, and, more particularly, to a vehicle having a ceramic dome and to the attachment or securement of the ceramic dome to the vehicle.

BACKGROUND ART

Outwardly-looking radar, infrared, and/or visible-light sensors built into vehicles such as aircraft or missiles are usually protected by a covering termed a dome or radome. The dome serves as a window that transmits the radiation sensed by the sensor. It also acts as a structural element that protects the sensor and carries aero-dynamic loadings. In many cases, the dome protects a forward-looking sensor, so that the dome must bear large aerostructural loadings.

In one embodiment, an infrared seeker system for missile design generally employs as the dome a protective non-opaque surface to protect its inherently delicate components. Typical applications for this protective surface are semi-spherical or semi-aspherical (conformed) ceramic domes. One popular material for missile applications in the infrared wavelength band is sapphire (a form of $Al_2O_3$). These sapphire domes must be located to the missile body by one or more attachment mechanisms.

A common practice for these attachment mechanisms is kinematic mechanical clamps or locating devices combined with high temperature silicon glue. Failure in these joints can occur due to missile flight dynamics, causing thermal and stress conditions exceeding the operational strength of the joint. Over the last few years, Raytheon engineers have devised techniques and processes to replace the silicon joints with brazed sapphire dome assemblies; see, e.g., U.S. Pat. No. 5,758,845, entitled "VEHICLE HAVING A CERAMIC RADOME WITH A COMPLIANT, DISENGAGEABLE ATTACHMENT", issued on Jun. 2, 1998, to Wayne Sunne et al; U.S. Pat. No. 5,884,864, entitled "VEHICLE HAVING A CERAMIC RADOME AFFIXED THERETO BY A COMPLIANT METALLIC TRANSITION ELEMENT", issued on Mar. 23, 1999, to Wayne Sunne et al; U.S. Pat. No. 5,941,479, entitled "VEHICLE HAVING A CERAMIC RADOME AFFIXED THERETO BY A COMPLIANT METALLIC "T"-FLEXURE ELEMENT", issued on Aug. 24, 1999, to Wayne L. Sunne et al; U.S. Pat. No. 6,123,026, entitled "SYSTEM AND METHOD FOR INCREASING THE DURABILITY OF A SAPPHIRE WINDOW IN HIGH STRESS ENVIRONMENTS", issued on Sep. 26, 2000, to James H. Gottlieb; U.S. Pat. No. 6,241,184, entitled "VEHICLE HAVING A CERAMIC RADOME JOINED THERETO BY AN ACTIVELY BRAZED COMPLIANT METALLIC TRANSITION ELEMENT", issued on Jun. 5, 2001, to Wayne Sunne et al. The foregoing patents are all assigned to the same assignee as the present application. Brazed sapphire dome assemblies have out-performed earlier state-of-the-art assemblies.

Nevertheless, improvements are continually sought to further reduce stresses related to the different coefficients of thermal expansion in the sapphire (dome)/niobium (transition)/titanium (body) connection.

DISCLOSURE OF INVENTION

In accordance with one embodiment of the present invention, a combination of a ceramic element joint to a metallic element by an attachment structure is provided. The attachment structure comprises:

(a) a form-factored, compliant metallic transition element having a "C" shape;

(b) a first joint material connecting an upper portion of the transition element to the ceramic element; and (c) a second joint material connecting a lower portion of the transition element to the metallic element.

In accordance with another embodiment of the present invention, a vehicle having a ceramic dome is provided, comprising:

(a) a vehicle body having an opening therein;

(b) the ceramic dome sized to cover the opening of the vehicle body; and (c) an attachment structure joining the dome to the vehicle body to cover the opening, the attachment structure comprising (i) a form-factored, compliant metallic transition element having a "C" shape, (ii) a first joint material connecting an upper portion of the transition element to the ceramic dome, and (iii) a second joint material connecting a lower portion of the transition element to the vehicle body.

Further in accordance with the present invention, a form-factored, compliant metallic transition element having a "C"-shape is provided for connecting a ceramic element to a metallic element. The transition element combines a transition in coefficient of thermal conductivity and stress relief in one element.

Yet further in accordance with the present invention, a method is provided for securing a ceramic element to a metallic element, each having a different coefficient of thermal expansion, with a transition element to permit flexibility and absorb expansion. The method comprises the steps of:

(a) providing as the transition element a form-factored compliant metallic transition element having a "C"-shape;

(b) positioning the transition element between the ceramic element and the metallic element;

(c) in either order, disposing a first brazing alloy disposed between the ceramic element and the transition element and disposing a second brazing alloy between the transition element and the metallic element, the first and second brazing alloys having substantially the same brazing temperature; and (d) brazing the first and second brazing alloys at the same time to complete securing the ceramic element to the metallic element.

Also in accordance with the present invention, a method is provided for preparing the vehicle having the ceramic dome affixed thereto. The method comprises the steps of:

(a) providing the vehicle body having an opening therein;

(b) providing the ceramic dome sized to cover the opening of the vehicle body;

(c) positioning the compliant metallic aero-shield "C"-shaped flexure element disposed structurally between the dome and the body;

(d) affixing the dome to the vehicle body using a first brazing alloy disposed between the dome and the flexure element and a second brazing alloy disposed between the flexure element and the vehicle body, the first and second brazing alloys having substantially the same brazing temperature so that securing the ceramic dome to the vehicle body is accomplished in a single brazing operation; and (e) brazing the first and second brazing alloys at the same time to complete securing the dome to the vehicle body.

The structure disclosed and claimed herein further minimize the stresses related to the different coefficients of thermal expansion in the ceramic sapphire (dome)/niobium (transition)/metallic titanium (body) connection.

BEST MODES FOR CARRYING OUT THE INVENTION

Figure 1:
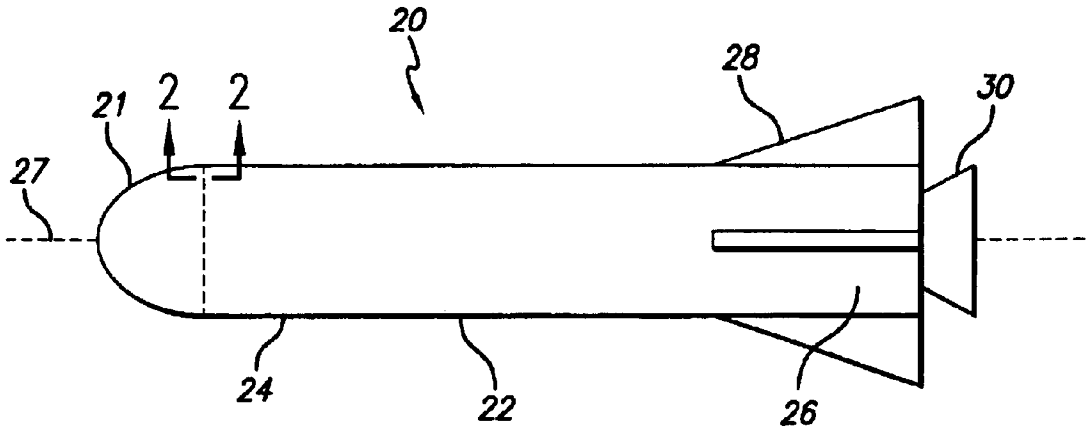
FIG. 1 PRIOR ART
FIG. 1 is an elevational view of a missile with an attached dome.

FIG. 1 depicts a vehicle, here illustrated as a missile 20, having a dome or radome 21 attached thereto. The dome 21 is forwardly facing as the missile flies and is therefore provided with a generally ogival shape that achieves a compromise between good aerodynamic properties and good radiation transmission properties. The missile 20 has a missile body 22 with a forward end 24, rearward end 26, and a body axis 27. The missile body 22 is generally cylindrical, but it need not be perfectly so. Movable control fins 28 and an engine 30 (a rearward portion of which is visible in FIG. 1) are supported on the missile body 22. Inside the body of the missile are additional components that are not visible in FIG. 1, are well-known in the art, and whose detailed construction are not pertinent to the present invention, including, for example, a seeker having a sensor, a guidance controller, motors for moving the control fins, a warhead, and a supply of fuel.

Infrared Seeker Technology for missile designs generally employs a protective non-opaque surface to protect its inherently delicate components. Typical applications for this protective surface are semi-spherical or semi-aspherical (conformed) ceramic domes. One popular material for missile applications in the infrared wavelength band is sapphire. These sapphire domes must be located to the missile body by one or more attachment mechanisms. Common practice for these mechanisms is kinematic mechanical clamps or locating devices combined with high temperature silicon glue. Failure in these joints can occur due to missile flight dynamics, causing thermal and stress conditions exceeding the operational strength of the joint. Over the last few years, Raytheon engineers have devised techniques and processes to replace the silicon joints brazed sapphire dome assemblies. These assemblies have out-performed the previous state of the art.

Figure 2:
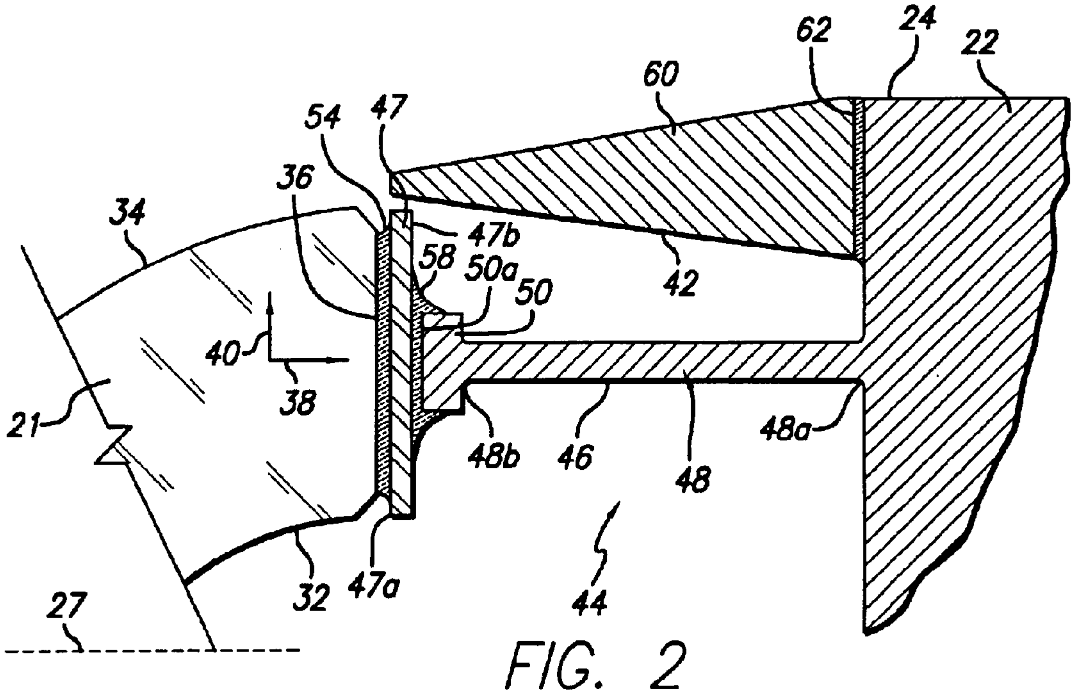
FIG. 2 PRIOR ART
FIG. 2 is a schematic enlarged sectional view of the missile of FIG. 1, taken along line 2—2 in a dome attachment region, depicting a prior art embodiment of a brazed dome design.

An example of a state-of-the-art brazed sapphire dome assembly design is depicted in FIG. 2. In that design, a sapphire dome is brazed to a niobium washer and is in turn brazed to a titanium flexure. The brazed assembly is then protected by an aero-shield in order to protect the double brazed joint from the aero-thermal environment inherent in missile flight. An air gap insulates the inner surface exposed to the sensor from the outer surface exposed to the air stream.

FIG. 2 illustrates a region at the forward end 24 of the missile body 22, where the dome 21 attaches to the missile body 22. The dome 21 has an inside surface 32, an outside surface 34, and a lower margin surface 36 extending between the inner surface 32 and the outer surface 34. The lower margin surface 36 is generally perpendicular to the body axis 27. The dome 21 is made of a ceramic material, typically, sapphire, a form of aluminum oxide. For structural reasons, the dome 21 is typically fabricated with a crystallographic c-axis 38 of the sapphire generally (but not necessarily exactly) perpendicular to the margin surface 36. Thus, in the region of the dome 21 near to the margin surface 36, the crystallographic a-axis 40 of the sapphire is generally (but not necessarily exactly) perpendicular to the inner surface 32 and to the outer surface 34. However, for some applications, the crystallographic orientation of the sapphire may be other than along the a- or c-axis, in order to provide certain structural advantages for aerodynamic loading, such as disclosed, for example, in U.S. Pat. No. 6,123,026, issued Sep. 26, 2000.

The most forward end of the missile body 22 defines a nose opening 42, which in this case is substantially circular because the missile body is generally cylindrical. An attachment structure 44 joins the dome 21 to the missile body 22 in order to cover and enclose the opening 42. The attachment structure includes a compliant "T"-flexure element 46, which is an integral part of the missile body 22. The "T"-flexure element 46 has the form of a ring that extends around the entire opening 42, but is shown in section in FIG. 2.

In section, the "T"-flexure element 46 has a substantially T-shape, and comprises an elongated compliant arm region 48 that extends generally parallel to the body axis 27 of the missile 20. The arm region 48 is secured at one end *48a* to the missile body 22 and, in fact, is integral with the missile body. A crossbar region 50, secured to the opposite end *48b*, is perpendicular to the arm region 48 and thence generally perpendicular to the body axis 27. The arm region 48 and the crossbar region 50 are integrally formed as part of the missile body 22. The arm region 48 and the crossbar region 50 preferably extend completely around the circumference of the ring of the "T"-flexure element 46. Essentially, the missile body 22 is thinned in the area of the arm region 48 so as to provide flexure, as described more fully below. The thinning of the arm region 48 is conventional and forms no part of the present invention.

The dome 21 is joined to the "T"-flexure element 46 at a first attachment, through a niobium-containing washer 47. The first attachment is preferably a first brazed butt joint 54 between an upper surface *47a* of the niobium washer 47 of the "T"-flexure element 46 and the lower margin surface 36 of the ceramic dome 21. The first brazed butt joint 54 is preferably formed using an active brazing alloy that chemically reacts with the material of the dome 21 during the brazing operation.

In forming this butt joint 54, care is taken that the brazing alloy contacts only the lower margin surface 36 of the dome 21, and not its inside surface 32 or its outside surface 34. The molten form of the active brazing alloy used to form the butt joint 54 can damage the inside surface 32 and the outside surface 34 of the dome, which lie perpendicular to the crystallographic a-axis 40 of the sapphire material. The lower margin surface 36, which lies perpendicular to the crystallographic c-axis 38 of the sapphire material, is much more resistant to damage by the active brazing alloy. The use of the butt joint only to the lower margin surface 36 of the sapphire dome thus minimizes damage to the sapphire material induced by the attachment approach.

The use of a butt joint to join the dome 21 to the "T"-flexure element 46 is to be contrasted with the more common approach for forming joints of two structures, a lap or shear joint. In this case, the lap joint would be undesirable for two reasons. The first, as discussed in the preceding paragraph, is that the lap joint would necessarily cause contact of the brazing alloy to the inside and/or outside surfaces of the dome, which are more sensitive to damage by the molten brazing alloy. The second is that the lap or shear joint would extend a distance upwardly along the inside or outside surface of the dome, reducing the side-viewing angle for the sensor that is located with the dome. That is, the further the opaque lap joint would extend along the surface of the dome, the less viewing angle would be available for the sensor. In some applications, this reduction of the side-viewing angle would be critical.

The niobium-containing washer 47 is joined to the "T"-flexure element 46 at a second attachment. The second attachment includes a second brazed butt joint 58 between a lower surface 47*b* of the washer 47 and an upper surface 50*a* of the crossbar region 50.

The missile body 22 is preferably made of a metal such as a titanium alloy. The titanium alloy of the missile body 22 and the sapphire of the dome 21 have different coefficients of thermal expansion (CTE). When the missile 20 is heated and cooled during fabrication or service, this difference in thermal expansion coefficients causes the total expansion of the dome 21 and the missile body 22 to be different. This difference would ordinarily produce thermally induced stresses in the dome 21 and the missile body 22. The thermally induced stresses have relatively small effects on the metallic missile body structure, but they can produce significant damage and reduction in failure stress in the ceramic material of the dome 21. The present approach of the combination of the "T"-flexure element 46 and niobium-containing washer 47 avoids or minimizes such thermally induced stresses.

The "T"-flexure element 46 is made of the same metal or metal alloy as the missile body 22. The arm region 48 is made relatively thin, so that it can bend and flex to accommodate differences in the coefficients of thermal expansion of the missile body 22 and the dome 21. Stated alternatively, the thermally induced stresses are introduced into the arm region 48 of the "T"-flexure element 46 and not into the dome 21. Further, the niobium-containing washer 47 acts as a CTE mismatch bridge between the sapphire dome 21 and the titanium body 22.

An aero ring 60 is brazed to the missile body 22 with a braze joint 62 and is used to protect the "T"-flexure element 46 and the niobium-containing washer 47 against aerodynamic stresses and temperatures during flight. The aero ring 60 may be spaced from the niobium-containing washer 47, as shown in FIG. 2, or may be butted against a portion of the bottom surface of the washer and sealed with a heat-resistant polymer, such as polysulfide (not shown).

Figure 3:
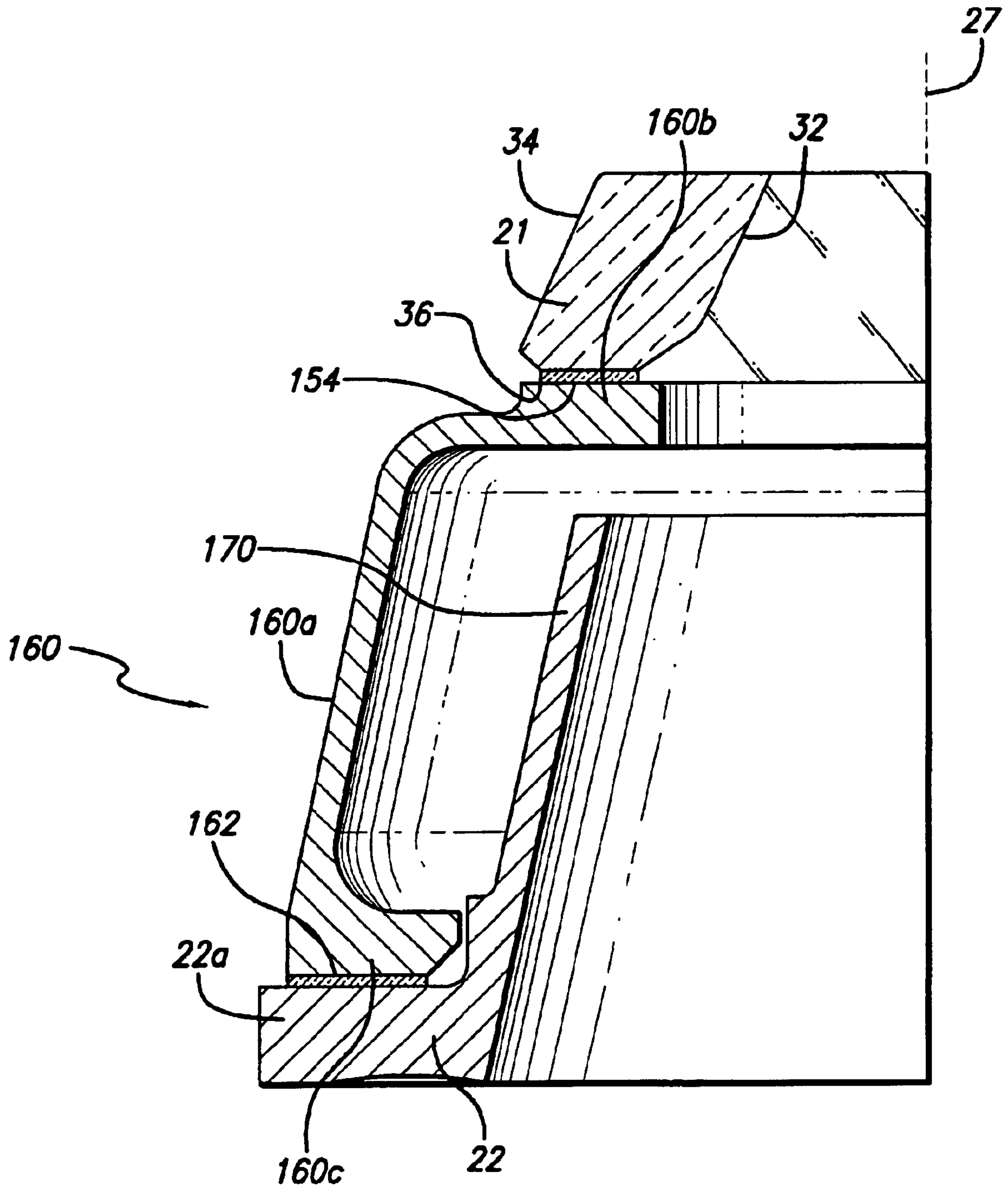
FIG. 3 is a three dimensional cross section of the brazed sapphire dome of the present invention, using a form-factored niobium transition flexure.

In accordance with the present invention, a sapphire dome is secured to a titanium body using a form-factored niobium transition flexure. FIG. 3 shows the sapphire dome 21, preferably brazed to the form-factored niobium transition flexure 160, using a first braze alloy. The dome 21 may be a conformal optical dome or a non-conformal optical dome. The teachings herein are not limited to the type of dome employed in the missile 20.

The form-factored niobium transition flexure 160 is preferably brazed to the titanium body, here, dome mount 22, using a second braze alloy. Incusil ABA braze alloy is used as the first braze alloy, while Incusil-15 is used as the second braze alloy. Incusil ABA and Insusil-15 are registered tradenames of WESGO Inc. Incusil ABA is an active braze alloy having a composition, in weight percent, of about 27.25 percent copper, about 12.5 percent indium, about 1.25 percent titanium, and the balance about 59 wt % silver, while Incusil-15, also an active braze alloy, has a composition, in weight percent of 61.5 percent silver, 23.5 percent copper, and 15 percent indium.

Whereas the specific braze alloys listed above have been optimized for this particular application, any brazing material within the active silver braze alloy family may be used for the first braze and any brazing material within the titanium doped active silver alloy family may be used for the second braze. The physical performance requirements of the assembly drive optimization to a particular alloy within the respective family of alloys for the brazed joints.

The design of the present invention employs the conventional current state-of-the-art features: thin niobium washers 154 and 162 as the transition elements and the separate aero-shield 160 (form-factored niobium transition element). A titanium heat shield 170 serves as a heat baffle, due to the extreme aero-thermal environment. The titanium heat shield 170 is incorporated as a feature of the dome mount (or missile body) 22 in order to simulate the air space 42 formed by the prior art titanium aero-shield 60, braze joint 62, and titanium flexure 48. This air space is required in order to create an air pocket insulation between the high operational temperatures of the outer missile body 22 and the intrinsically delicate electronic parts, including the seeker, within the missile body 22 and the dome 21.

The niobium transition element 47 of FIG. 2 is essentially stretched into the "C"-shaped transition element 160 of FIG. 3. This reconfiguration of the niobium washer 47 into the "C"-shaped washer 160 allows it to perform the same functions as both the flexure 48 and aero-shield 60 of FIG. 2, along with its original purpose of providing a stress-absorbing transition element 47 between the titanium dome mount 22 and the dome 21.

The major change from the state-of-the-art design to the design of the present invention exists in the aero-shield 160 replacing the aero ring 60, thereby obviating the additional second braze location 58 (in FIG. 2). In the present design, the niobium aero-shield 160 is used to secure the dome 21 to the missile body 22.

The shape of the niobium aero-shield 160 is contoured to match the shape of the vehicle, here, missile 20, thereby eliminating the need for a secondary missile shield (element 60 in FIG. 2). The niobium aero-shield 160 may be formed by a number of different methods, including, but not limited to, spin-forming, machining, or die-forming. By "form-factored" is meant that the niobium aero-shield 160 is preformed in a purpose-efficient shape. As used in a missile 20, this means that the aero-shield 160 is formed in a shape that is useful as part of the missile design.

The niobium aero-shield 160 is formed as a "C"-channel. Preferably, the aero-shield 160 has a generally flat upper connector portion 160*b* having an inner annulus and an outer annulus, a generally flat lower connector portion 160*c* having an inner annulus and an outer annulus, and a flexure portion 160*a* connecting the upper portion and the lower portion at the outer annulus of each.

The flexure portion 160*a* has a relatively thin cross-section in the flexure region 160*a*, from about 0.010 to 0.025 inch (0.254 to 0.635 mm), preferably about 0.015 inch (0.381 inch). The top connector portion 160*b* is somewhat thicker, but still relatively thin, in order to reduce stress on the dome 21. The thickness of the top connector portion 160*b* ranges from about 0.020 to 0.030 inch (0.508 to 0.762 mm). The bottom connector portion 160*c* is somewhat thicker still, and ranges from about 0.035 to 0.045 inch (0.889 to 1.143 mm).

The niobium aero-shield 160 is self-locating. That is to say, the gap between the niobium aero-shield 160 and the titanium turret 22*a* has been designed to be self-locating. Because the coefficient of expansion for Ti is greater than that for Nb, the gap has been designed so that at the braze temperature, the fit is at or close to line-to-line diametrically. This causes the inside diameter of the Nb aero-shield 160 (initially larger, but slower growing) to be forced concentric with the outside (initially smaller, but faster growing) diameter of the Ti turret 22*a*. Thereby, the thermal cycle of the braze operation centers the Nb aero-shield 160 on the Ti turret 22*a*.

The braze alloy disks used to form the braze joints 154, 162 are prefabricated rings of the appropriate annular diameter and are about 0.002 inch (0.051 mm) thick.

It is known that dissimilar materials possess dissimilar growth rates under thermal load. The rate of growth for particular materials is represented by its coefficient of thermal expansion (CTE). If two dissimilar metals are welded/brazed/-glued together and subsequently thermally cycled, a sheer stress directly related to the difference in material CTE will result. Sapphire and niobium have very similar CTEs. This results in the sapphire and niobium growing at very similar rates during the thermal changes, occurring during both flight and the braze process. Therefore, the brazed joint between the sapphire dome 21 and the niobium aero-shield 160 sees little sheer stress under heat cycling.

Titanium has a significantly higher CTE than the sapphire and the niobium. To reduce the stress at the titanium/niobium joint, the design employs a flexure allowing a prescribed displacement to reduce the stiffness of the joint. As the assembly is heat cycled, the titanium begins to out-grow the sapphire and niobium. Consequently, the thin flexure 160*a* begins to displace, thereby reducing and controlling the stress at the niobium/titanium joint.

To fabricate the missile 20 having the dome 21 joined to the missile body 22, the missile body 22 is provided, together with (1) the heat shield 170, (2) the "C"-shaped aero-shield/flexure transition element 160, and (3) the ceramic dome 21. The portion of the missile body 22 that forms the heat shield 170 and the turret mount 22*a* is preferably an integral unit as shown in FIG. 3 and comprises a titanium alloy such as Ti-6A1-4V, having a composition, in weight percent, of 6 percent aluminum, 4 percent vanadium, balance titanium. The aero-shield 160 is preferably a niobium-based alloy having a composition, in weight percent, of 1 percent zirconium, balance niobium. Other metals or alloys may be employed in place of the niobium-based alloy disclosed, so long as they have a coefficient of thermal expansion that is within about 0.5% that of sapphire and meet other required mechanical properties, such as strength. While examples of such other metals and alloys include tantalum, tantalum-tungsten, and Kovar, such metals and alloys are less preferred than the niobium-based alloy disclosed herein, mainly due to their cost. The niobium-based alloy is further preferred because it is readily available, is easily spin-formed or machined or die-formed, and has a coefficient of thermal expansion relatively close to that of the preferred dome material, sapphire.

The braze alloys 154, 162 described above are relatively low-temperature (approximately 1300° F., or 704° C.) for brazing the aero-shield 160 to both the ceramic dome 21 and the turret mount 22*a* of the missile body 22. The braze alloys are compatible with the materials of the missile body 22 and the dome 21.

The braze alloys are provided in the form of braze alloy disks, one of which is placed between the aero-shield 160 (upper connector portion 160*b*) and the ceramic dome 21 (for forming braze joint 154), and the other of which is placed between the aero-shield 160 (lower connector portion 160*c*) and the turret mount 22*a* (for forming braze joint 162). The brazing is accomplished by heating the missile body 22, the aero-shield 160, and the dome 21 with the braze alloy washers therebetween, to a brazing temperature sufficient to melt the braze alloy and cause it to flow freely, about 1330° F. (721° C.). The brazing is accomplished in a vacuum of about $8 \times 10^{-5}$ Torr or less and with a temperature cycle involving a ramping up from room temperature to the brazing temperature of about 1300° F. (704° C.), a hold at the brazing temperature for 9 minutes, and a ramping down to ambient temperature, the total cycle time being about 5 hours.

As noted previously, it is highly desirable that the braze alloy forming the braze joint 154 not contact the inside surface 32 or the outside surface 34 of the dome 21, and that the braze alloy only contact the margin surface 36. To achieve this end, the first braze alloy 154 is provided in the form of a flat disk that fits between the margin surface 36 and the upper connecting surface 160*b*. The volume of the braze element washer is chosen so that, upon melting, the braze material 154 just fills the region between the margin surface 36 and the upper connecting surface 160*b*. There is no excess braze alloy to flow onto the surfaces 32 and 34.

Likewise, the second braze alloy forming the second braze alloy joint 162 is also provided in the form of a flat disk that fits between the lower connecting surface 160*c* and the surface of the turret mount 22*a*.

During the braze operation of joining the ceramic dome 21 to the missile body 22, the aero-shield 160 is disposed circumferentially around the titanium heat shield 170.

The joints 154 and 162 are both preferably braze joints, as illustrated. The braze joints are preferred because they form a hermetic seal for the aero-shield 160. The hermetic seal prevents atmospheric contaminants from penetrating into the interior of the missile body during storage. It also prevents gasses and particulate material from penetrating into the interior of the missile body during service. Other operable joint structures and joining techniques may be used.

The advantages of the present design over the prior art designs include at least the following:

(1) The use of the niobium-based integral flexure and aero-shield 160 reduces the part count and allows a niobium element to perform three functions: (a) transition element; (b) flexure; and (c) aero-shield.

(2) The integration of the niobium transition element into the flexure 160 results in a lower inherent stress to the dome over niobium washer designs.

The foregoing description has been presented in terms of attachment of a ceramic dome, comprising sapphire, to a metallic body, e.g., a titanium alloy of a missile. However, it will be appreciated by those skilled in this art that the teachings herein are suitably employed for securing other ceramic materials, including alumina, doped alumina (doped with at least one transition metal ion), and other oxides, whether crystalline or non-crystalline, to other metals. In any case, suitable braze materials are used between the transition element and the ceramic element on one side and the metallic element on the other side. The larger the coefficient of thermal expansion between the ceramic material and the metal, then an increase in the length of the flexure element is required in order to permit flexibility and to absorb expansion. However, the determination of the appropriate braze materials and the length of the flexure element are considered to be readily within the ability of one skilled in this art, not requiring undue experimentation, based on the teachings herein.

Although a particular embodiment of the invention has been described in detail for purposes of illustration, various modifications and enhancements may be made with departing from the spirit and scope of the invention. Accordingly, the invention is not to be limited except as by the appended claims.

What is claimed is:

1. In combination, a ceramic element joint secured to a metallic element by an attachment structure, the ceramic element having an outer surface and the metallic element having an outer surface, the attachment structure comprising:

(a) a form-factored, compliant metallic transition element having a "C" shape, with an elongated portion terminating in an upper portion and a lower portion, the elongated portion having an outer surface;

(b) a first joint material connecting the upper portion of the transition element to the ceramic element; and (c) a second joint material connecting the lower portion of the transition element to the metallic element, whereby the outer surface of the elongated portion is approximately contoured to match the outer surfaces of both the ceramic element and the metallic element.

2. The combination of claim 1 wherein the ceramic element comprises an oxide material.

3. The combination of claim 2 wherein the oxide material comprises an aluminum oxide or an aluminum oxide doped with at least one transition metal ion.

4. The combination of claim 3 wherein the oxide material comprises sapphire.

5. The combination of claim 1 wherein the metallic transition element comprises niobium or an alloy thereof.

6. The combination of claim 1 wherein the metallic element comprises titanium or an alloy thereof.

7. The combination of claim 1, wherein the first joint material and the second joint material are brazed joints, each comprising a material having a coefficient of thermal expansion that is within 0.5% of that of the materials to which it is joined.

8. A vehicle having a ceramic dome, comprising:

(a) a vehicle body having an opening therein;

(b) the ceramic dome sized to cover the opening of the vehicle body; and (c) an attachment structure joining the dome to the vehicle body to cover the opening, the attachment structure comprising (1) a form-factored, compliant metallic transition element having a "C" shape, with an elongated portion terminating in an upper portion and a lower portion, the elongated portion having an outer surface, (b) a first joint material connecting the upper portion of the transition element to the ceramic dome, and (c) a second joint material connecting the lower portion of the transition clement to the vehicle body, whereby the outer surface of the elongated portion is contoured to match the shape of the vehicle between the ceramic dome and the vehicle body.

9. The vehicle of claim 8, wherein the vehicle body is a nose of a missile.

10. The vehicle of claim 8, wherein the opening is substantially circular, wherein the dome has a substantially circular base sized to join to the opening, and wherein the transition element is a ring disposed between the opening and the base of the dome.

11. The vehicle of claim 8, wherein the dome comprises sapphire, the transition element comprises niobium or an alloy thereof, and the vehicle body comprises a titanium alloy.

12. The vehicle of claim 8, wherein the first joint material and the second joint material are brazed joints, each comprising a material having a coefficient of thermal expansion that is within 0.5% of that of the materials to which it is joined.

13. A vehicle having a ceramic dome, comprising:

(a) a metallic missile body having a substantially circular nose opening therein;

(b) the ceramic dome sized to cover the nose opening, the dome having an outside surface, an inside surface, and a lower margin surface extending between the outside surface and the inside surface; and (c) an attachment structure joining the dome to the missile body to cover the opening, the attachment structure comprising (1) a form-factored, compliant metallic transition element having a "C" shape, with a generally flat upper connector portion having an inner annulus and an outer annulus, a generally flat lower connector portion having an inner annulus and an outer annulus, and a flexure portion connecting the upper portion and the lower portion at the outer annulus of each, (2) a first brazed joint material connecting the upper connector portion to the ceramic dome, the first joint material having a coefficient of thermal expansion that is similar to that of ceramic dome and the material comprising the transition element, and (3) a second brazed joint material connecting the lower connector portion to the vehicle body, the second joint material having a coefficient of thermal expansion that is similar to that of the material comprising the transition element and the material comprising the vehicle body, whereby the flexure portion is contoured to match the shape of the vehicle between the ceramic dome and the missile body.

14. The vehicle of claim 13, wherein the dome comprises sapphire, the aero-shield comprises niobium or an alloy thereof, and the vehicle body comprises a titanium alloy.

15. The vehicle of claim 13, wherein the dome comprises sapphire having a crystallographic c-axis oriented substantially perpendicular to the margin surface.

16. The vehicle of claim 13, wherein the first brazed joint and the second brazed joint each comprises an active brazing material.

17. The vehicle of claim 16, wherein the active brazing material for the first braze joint comprises about 27.25 wt % copper, about 12.5 wt % indium, about 1.25 wt % titanium, and the balance silver.

18. The vehicle of claim 16 wherein the active brazing material for the second braze joint comprises about 23.5 wt % copper, about 15 wt % indium, and the balance silver.

19. The combination of claim 1 further including a heat shield interior of the transition element formed by a portion of the ceramic element that extends behind the transition element to create a thermally insulating air space between the transition element and the heat shield.

20. The vehicle of claim 8 further including a heat shield interior of the transition element formed by a portion of the ceramic dome that extends behind the transition element to create a thermally insulating air space between the transition element and the heat shield.

21. The vehicle of claim 13 further including a heat shield interior of the transition element formed by a portion of the ceramic dome that extends behind the transition element to create a thermally insulating air space between the transition element and the heat shield.

* * * * *